(12) United States Patent
Reddy et al.

(10) Patent No.: US 12,348,582 B2
(45) Date of Patent: Jul. 1, 2025

(54) LOAD BALANCING OF PERFORMANCE MANAGEMENT AND FAULT MANAGEMENT MICROSERVICES

(71) Applicant: Rakuten Symphony, Inc., Tokyo (JP)

(72) Inventors: Virendra Reddy, Bangalore (IN); Prasaanth Gowravalli, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/013,452

(22) PCT Filed: Nov. 29, 2022

(86) PCT No.: PCT/US2022/051190
§ 371 (c)(1),
(2) Date: Dec. 28, 2022

(87) PCT Pub. No.: WO2024/118053
PCT Pub. Date: Jun. 6, 2024

(65) Prior Publication Data
US 2025/0097285 A1    Mar. 20, 2025

(51) Int. Cl.
H04W 28/08 (2023.01)
H04L 67/1008 (2022.01)
(Continued)

(52) U.S. Cl.
CPC .......... *H04L 67/1008* (2013.01); *H04L 69/40* (2013.01); *H04W 24/02* (2013.01)

(58) Field of Classification Search
CPC ..... H04W 36/22; H04W 28/08; H04W 24/02; H04W 28/0861; H04W 28/0958;
(Continued)

(56) References Cited

U.S. PATENT DOCUMENTS

| | | | |
|---|---|---|---|
| 2008/0186862 A1* | 8/2008 | Corbett | H04W 72/52 370/237 |
| 2016/0135087 A1* | 5/2016 | Xu | H04W 72/541 455/436 |

FOREIGN PATENT DOCUMENTS

CN      119211972 A   * 12/2024

OTHER PUBLICATIONS

Written Opinion dated Apr. 13, 2023 issued by the International Searching Authority in application No. PCT/US2022/051190.
(Continued)

*Primary Examiner* — Quan M Hua
(74) *Attorney, Agent, or Firm* — Sughrue Mion, PLLC

(57) ABSTRACT

A method and system for load balancing of a Fault Management (FM) microservice (MS) and a Performance Management (PM) MS in a Network Function (NF) are provided. The method includes: determining whether there is a load issue in a first microservice (MS), the first MS being one of the FM and the PM MS; based on determining that there is the load issue, providing data, reported by at least one other MS for the first MS, to a second MS, the second MS being the other of the FM, and PM MS; and processing, by the second MS, the data and reporting, from the second MS to a northbound management system (NBMS), the processed data, wherein the FM MS is configured to receive the event data from the at least one MS, and the PM MS is configured to receive the performance data from the at least one MS.

20 Claims, 8 Drawing Sheets

(51) Int. Cl.
*H04L 69/40* (2022.01)
*H04W 24/02* (2009.01)

(58) Field of Classification Search
CPC ............. H04W 36/20; H04W 28/0284; H04W 28/0862; H04W 36/08; H04W 28/0268; H04W 28/0942; H04W 16/08; H04W 28/082; H04W 48/06; H04W 72/0453; H04W 28/24; H04W 36/0009; H04W 36/0058; H04W 36/00835; H04W 36/00838; H04W 36/26; H04W 36/34; H04W 4/06; H04W 4/24; H04W 52/0258; H04W 52/028; H04W 52/286; H04W 52/30; H04W 52/367; H04W 72/0446; H04W 72/23; H04W 72/27; H04W 72/51; H04W 72/56; H04W 76/27; H04W 72/00; H04L 49/50; H04L 67/12; H04L 41/0823; H04L 47/10; H04L 45/123; H04L 45/24; H04L 47/125

See application file for complete search history.

(56) References Cited

OTHER PUBLICATIONS

International Search Report dated Apr. 13, 2023 issued by the International Searching Authority in application No. PCT/US2022/051190.

* cited by examiner

FIG. 3
Related Art
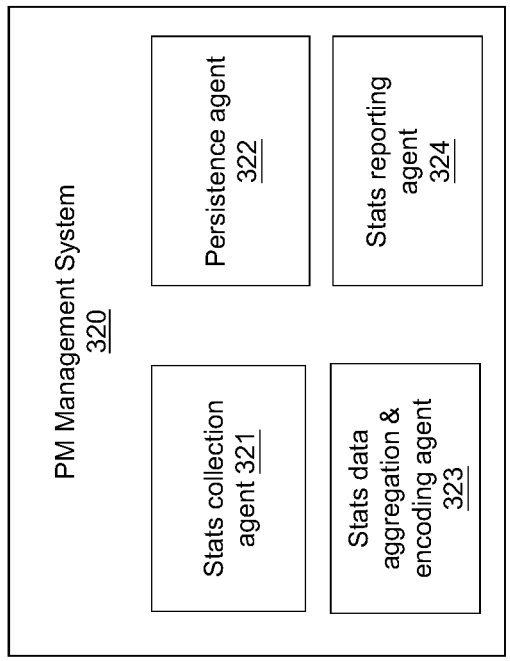
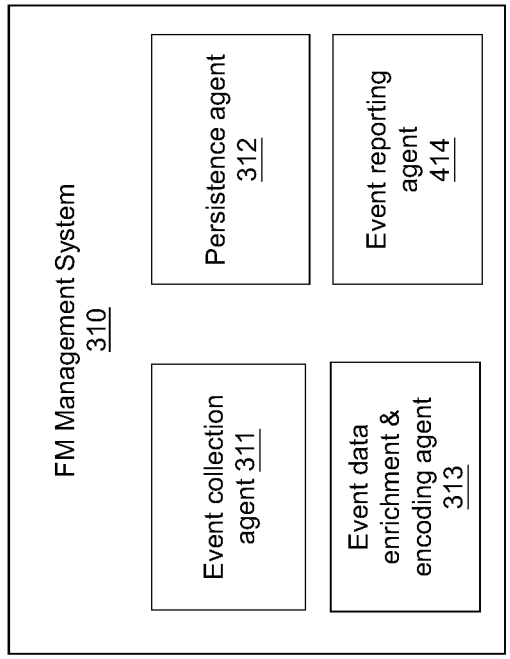

LOAD BALANCING OF PERFORMANCE MANAGEMENT AND FAULT MANAGEMENT MICROSERVICES

FIELD

System and methods consistent with example embodiments of the present disclosure relate to load balancing of performance management and fault management microservices.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Recently, the evolution of telco technologies enables many telco services to be realized virtually in the form of software. For instance, RANs such as Open RAN (O-RAN) architectures, disaggregate one network component into multiple functional elements. By way of example, a baseband unit (BBU) or base station (i.e., eNB or gNB) is disaggregated into a number of functional elements including a distributed unit (DU) and a centralized unit (CU), wherein the CU can be further disaggregated into Centralized Unit-Control Plane (CU-CP) and Centralized Unit-User Plane (CU-UP). The disaggregation of network elements enables the telco services and the associated functions to be defined and provided in software-based form or virtual network services, such as Virtualized Network Functions (VNFs), Cloud-native Network Functions (CNFs) or Software Defined Networking (SDN), among others.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N in FIG. 1), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN centralized Unit (O-CU), O-RAN Distributed Unit (O-DU), etc.).

The SMO framework manages and orchestrates RAN elements. Specifically, the SMO includes a Federated O-Cloud Orchestration and Management (FOCOM), a Network Function Orchestrator (NFO) that manages Virtual Machines (VM) based VNF and container (i.e., instance) based VNF, and the OAM as a part of the SMO that manages and orchestrates what is referred to as the O-Ran Cloud (O-Cloud).

Further, the SMO may include an operational support system (OSS) and an element management system (EMS), each of which is configurable to perform one or more of: fault management operation, configuration management operation, account management operation, performance management operation, and security management operation (FCAPS operations), on one or more services hosted or deployed in the servers. In some embodiments, the service management system may include a plurality of EMSs, each of the plurality of EMSs may be configured to manage a single service or a group of services associated with a particular vendor/service provider, and the OSS interfaces between the monitoring system, orchestrator, and the plurality of EMSs. Accordingly, the SMO may provide a single control point for managing a plurality of services (associated with multiple vendors/network service providers) via only one monitoring system and one orchestrator system (i.e., one monitoring system and one orchestrator system can be utilized to manage services associated with multiple vendors/service providers).

In the related art 5G architecture (O-RAN based), functionalities or subsystems in a Network Function (NF) may be implemented as microservices. For example, RU manager is a microservice which handles the DU⇔RU related transactions. Baseband microservice implements the layer-1 and layer-2 of the 5G stack. FCAPS microservices is a set of microservices which handle aspects of the system like Fault Management, Configuration Management and Performance Management of the gNodeB network function (gNB NF).

Fault Management microservice (FM MS) is responsible for collecting various events related to the functionality aspects (e.g. faults, error conditions, etc.) of the 5G O-RAN subsystems (such as those described above) within an NF. FM MS may collect the various fault events, e.g., cell down, F1C link down, timing locked etc., from various microservices present in the gNB NF. FM MS then reports those events immediately to the Northbound management system (NBMS) for triggering any post-processing or corrective measures.

Performance Management microservice (PM MS) is responsible for collecting various statistics and counters related to performance aspects of the 5G O-RAN subsystems. It then reports the performance statistics, e.g., throughput, active users, cell uptime, etc. after enriching the data summary to the NBMS at predefined regular intervals, e.g., every 1 minutes, 15 minutes etc.

Further, FM MS handles the fault management events that are related to functionality aspects, and PM MS handles the performance management statistics and counters related to performance aspect. Therefore, FM MS and PM MS are quite similar microservices with respect to their interaction with the subsystems (collection and persistence aspect) and the northbound (reporting aspect). The FM MS or PM MS based on predefined conditions, sends notifications and stats reports to a Northbound Management System (NBMS). The NBMS based on the notification reports, may create an alarm and consequently, initiates a triggering procedure for post processing or corrective measures that are associated with the alarm.

FIG. 2 is a block diagram of a communication flow of a Network Function (NF) 260 and a Northbound Management System (NBMS) 210 in the related art. Referring to FIG. 2, the related art approach is to have a set of FM MS 220 and PM MS 230 in active-active mode to receive, store (in persistence layer 240), process, and transmit to the NBMS 210 (e.g., EMS and/or OSS) events and statistics received from microservices 250-1, 250-2, . . . , 250-n (e.g., microservices implementing various subsystems as described above of the NF) based on predetermined criteria.

FIG. 3 is a block diagram of components of a Fault Management (FM) microservice 310 and a Performance Management (PM) microservice 320 implemented in an NF. Referring to FIG. 3, the FM MS 310 may include: event collection agent 311 for receiving event data (e.g., fault-related event data) from subsystems (i.e., microservices) in the NF; persistence agent 312 for storing the received event data (in either or both of raw data form as received or enriched/encoded form as processed by the FM MS 310); event data enrichment & encoding agent 313 for enriching and encoding the received event data (raw data); and event reporting agent 314 for reporting the enriched and encoded event data to the NBMS. The PM MS 320 may include: stats collection agent 321 for receiving performance statistics data from subsystems (i.e., microservices) in the NF; persistence agent 322 for storing the received performance statistics data (in either or both of raw data form as received or aggregated/encoded form as processed by the PM MS 320); stats data aggregation & encoding agent 323 for aggregating and encoding the received statistics data (raw data); and stats reporting agent 324 for reporting the aggregated and encoded statistics data to the NBMS.

In the CNF-based 5G O-RAN implementation, it becomes critical to always have the FM MS and PM MS within a particular NF (e.g., O-CU or O-DU) available in working condition to avoid any impact on the overall functioning of the RAN. To this end, if either of the FM MS or the PM MS is facing load issues (e.g., the FM MS or the PM MS is receiving more requests to process the raw data than it can handle), then FM MS or PM MS may be unable to process the raw data in timely manner. In the related art, a highly loaded MS may be addressed by instantiating or spawning another instance for that MS for sharing the load. However, additional instantiations of an MS may not be suitable, particularly if there is an explicit or implicit constraint on hardware resources. For example, the microservices may be configured to consist of predefined instances of a specific microservice or the constraint may be due to infrastructure limitations. Therefore, in this case, an additional instantiation of the highly loaded FM MS or PM MS may not be possible, thereby resulting in loss of critical FM events or PM statistics data and/or a delayed handling of them causing overall user experience issues. Therefore, there is a need to introduce load balancing of FM MS and PM MS so that there is no delayed processing (e.g., aggregation, enrichment, encoding, etc.) by the FM and PM microservices.

SUMMARY

According to one or more embodiments, apparatuses and methods are provided for load balancing and quick processing of events, even under constrained resources, by integrating a standby FM MS functionality into a PM MS and integrating a standby PM MS functionality into an FM MS. That is, in accordance with one or more embodiments, the PM MS provides backup functions for the FM MS in case of heavy load on the FM MS, and the FM MS provides backup functions for the PM MS in case of heavy load on the PM MS. As a result, loss or delayed handling of critical FM events or PM statistics data can be avoided, thereby improving overall user experience and network reliability.

According to at least one embodiment, a method of load balancing of a Fault Management (FM) microservice (MS) and a Performance Management (PM) MS in a Radio Access Network (RAN) Network Function (NF), performed by at least one processor, includes: determining whether there is a load issue in a first microservice (MS), the first MS being one of the FM MS and the PM MS; based on determining that there is the load issue in the first MS, providing data reported by at least one other MS of the NF for the first MS to a second MS, the second MS being another one of the FM MS and the PM MS, and the data being performance data for the PM MS or event data for the FM MS; and based on determining that there is the load issue in the first MS, processing, by the second MS, the data and reporting, from the second MS to a northbound management system (NBMS), the processed data, wherein the FM MS is configured to receive the event data from the at least one MS, and the PM MS is configured to receive the performance data from the at least one MS.

According to at least one embodiment, a system for load balancing of a Fault Management (FM) microservice (MS) and a Performance Management (PM) MS in a Radio Access Network (RAN) Network Function (NF), includes: at least one memory storing instructions; and at least one processor configured to execute the instructions to: determine whether there is a load issue in a first microservice (MS), the first MS being one of the FM MS and the PM MS; based on determining that there is the load issue in the first MS, provide data reported by at least one other MS of the NF for the first MS to a second MS, the second MS being another one of the FM MS and the PM MS, and the data being performance data for the PM MS or event data for the FM MS; and based on determining that there is the load issue in the first MS, process, by the second MS, the data and report, from the second MS to a northbound management system (NBMS), the processed data, wherein the FM MS is configured to receive the event data from the at least one MS, and the PM MS is configured to receive the performance data from the at least one MS.

According to at least one embodiment, a non-transitory computer-readable recording medium has recorded thereon instructions executable by at least one processor to perform a method of load balancing of a Fault Management (FM) microservice (MS) and a Performance Management (PM) MS in a Radio Access Network (RAN) Network Function (NF), performed by at least one processor, the method including: determining whether there is a load issue in a first microservice (MS), the first MS being one of the FM MS and the PM MS; based on determining that there is the load issue in the first MS, providing data reported by at least one other MS of the NF for the first MS to a second MS, the second MS being another one of the FM MS and the PM MS, and the data being performance data for the PM MS or event data for the FM MS; and based on determining that there is the load issue in the first MS, processing, by the second MS, the data and reporting, from the second MS to a northbound management system (NBMS), the processed data, wherein the FM MS is configured to receive the event data from the at least one MS, and the PM MS is configured to receive the performance data from the at least one MS.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 3 is a block diagram of components of a Fault Management (FM) microservice and a Performance Management (PM) microservice implemented in an NF;

DETAILED DESCRIPTION

Figure 1:
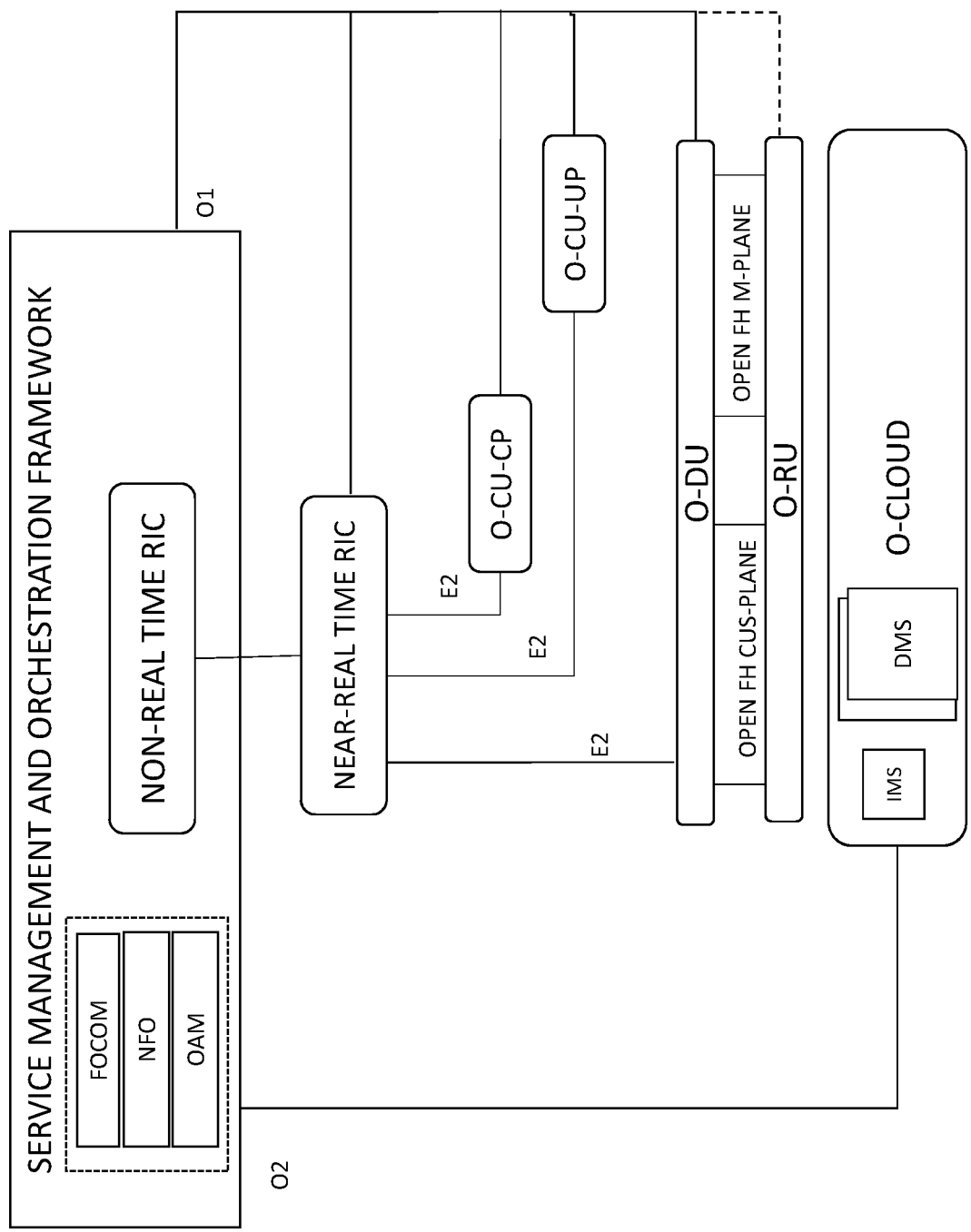
FIG. 1 illustrates an O-RAN architecture according to the related art.
Figure 2:
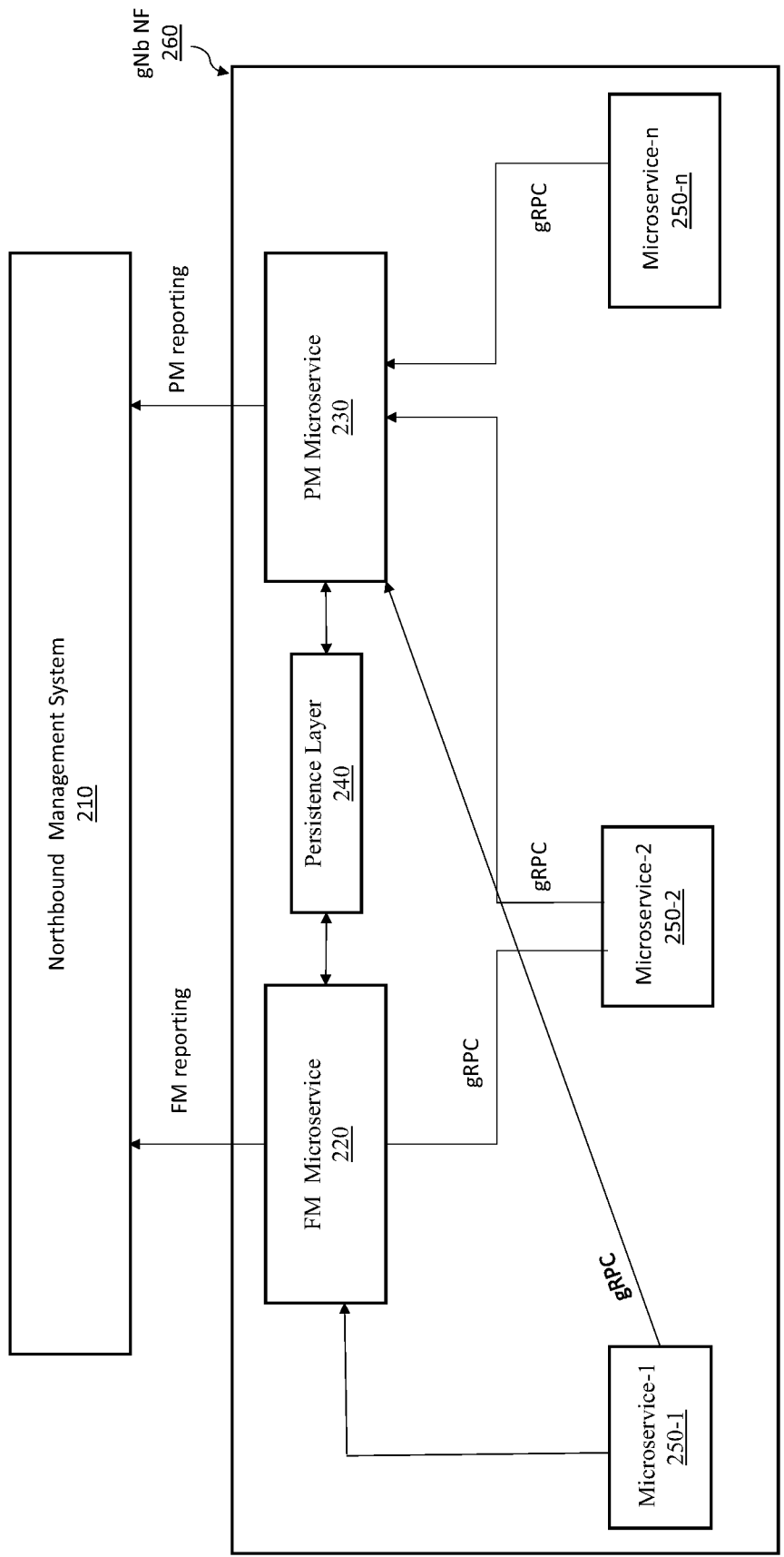
FIG. 2 is a block diagram of a communication flow of a Network Function (NF) and a Northbound Management System (NBMS) in the related art.

The following detailed description of example embodiments refers to the accompanying drawings.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Example embodiments of the present disclosure provide a method and system for load balancing of FM MS and PM MS. Particularly, when the FM MS or PM MS is unable to process efficiently or timely due to high load, the standby MS may process the event data or stats data. Accordingly, example embodiments of the present disclosure are directed to load balancing of FM MS and PM MS, so that there is no delayed processing of FM or PM data for an overall smooth and efficient functioning of RAN. The embodiments of the present disclosure provide a quicker and more efficient approach of load balancing FM MS events or PM MS stats data that increases the overall user experience even under constrained resources.

Figure 4:
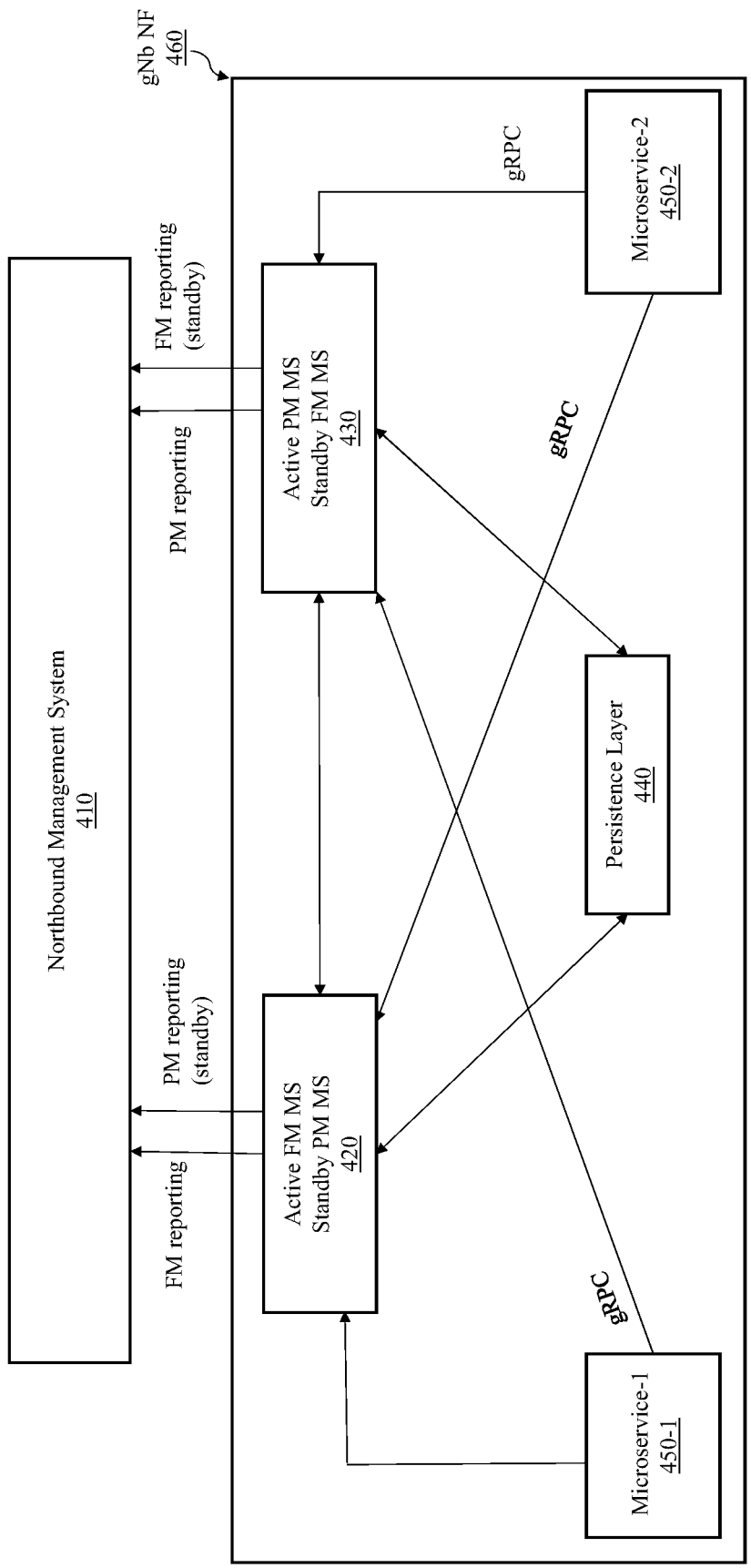
FIG. 4 is a is a block diagram of a communication flow of a Network Function (NF) for load balancing of FM MS and PM MS, according to an embodiment.

FIG. 4 is a block diagram of a communication flow of a Network Function (NF) 460 (e.g., CU, DU, etc.) for load balancing of FM MS 420 and PM MS 430, according to an example embodiment. In particular, FIG. 4 illustrates a system for load balancing when either the FM MS 420 or the PM MS 430 may be unable to process data, received from various other microservices 450-1, 450-2, in an efficient or timely manner due to high load. When an active FM MS 420 or PM MS 430 reports the data to the NBMS 410, it provides the data to the NBMS 410 (e.g., EMS and/or OSS) through an O1 interface (e.g., management interface). For example, the NBMS 410 may implement a Kafka cluster to collect at least one of FM event data or PM stats data. Kafka is an open-source system that provides a unified, high-throughput, low-latency platform for handling real-time data feeds. Kafka can connect to external systems (for data import/export) via Kafka Connect, and provides the Kafka Streams libraries for stream processing applications. Kafka uses a binary TCP-based protocol that is optimized for efficiency and relies on a "message set" abstraction that naturally groups messages together to reduce the overhead of the network roundtrip. While Kafka may be used in some embodiments, other real time data streams may be used, and these streams may also be open-source. The use of real time data streams, and microservices create a new restructuring open-source platform. The data from FM MS 420 and PM MS 430 may have an Internet Protocol (IP) address (e.g., IPv4, IPv6, etc.) through which it may communicate to the NBMS 410.

According to example embodiments, either FM MS or PM MS may be a standby MS for the other that is highly loaded and unable to process the raw data. The standby MS according to an example embodiment will perform the functions of the other MS (e.g., process raw data and transmit enriched and encoded data normally handled by the other MS) in case the active MS is overloaded with the events or stats data. Since each microservice can have its own processing and may be able to process the other MS's request as well, the standby MS would be in working condition when the other one is highly loaded. Therefore, the FM MS 420 or the PM MS 430 may communicate with each other (directly or indirectly via an orchestrator or another component or layer in the NF's architecture, e.g., Kubernetes) that the active MS is highly loaded and might not be able to process the event or data quickly. In the present embodiment, the raw data (event data or stats data) normally destined to the active MS is rerouted to the standby MS. For example, the raw data is rerouted by a decision agent from the reporting MS 450-1, 450-2 to the standby MS. Alternatively, the active MS may hand over the raw data for enrichment/aggregation and encoding data to the other MS (standby MS) via the persistence layer 440, e.g., by signaling to the other MS that the active MS is highly loaded and unable to timely process the data such that the other MS obtains the raw data from the persistence layer 440. According to another embodiment, the active MS may directly provide the raw data to the standby MS for processing (e.g., aggregation, enrichment, encoding, etc.).

The load balancing of FM MS and PM MS may be carried out or controlled by a decision agent. The decision agent (e.g., a decision maker application or microservice) may determine whether the FM MS and/or the PM MS is highly loaded (e.g., by comparing one or more performance or processing parameters against one or more thresholds). If the decision agent determines that the active MS (i.e., one of the FM MS and PM MS) is highly loaded, then it determines to reroute data for the active (default) MS that is configured to perform the processing, to the other (standby) MS. The decision agent may be implemented in a particular layer or location of the network function architecture (e.g., in a Kubernetes layer). The cloud infrastructure and health/liveness probes that are present in the decision layer, that may be part of the gNb NF architecture, may be able to detect the health and load of the active MS and may be configured to redirect the data messages (gRPC) from the active MS to the standby MS.

Figure 5:
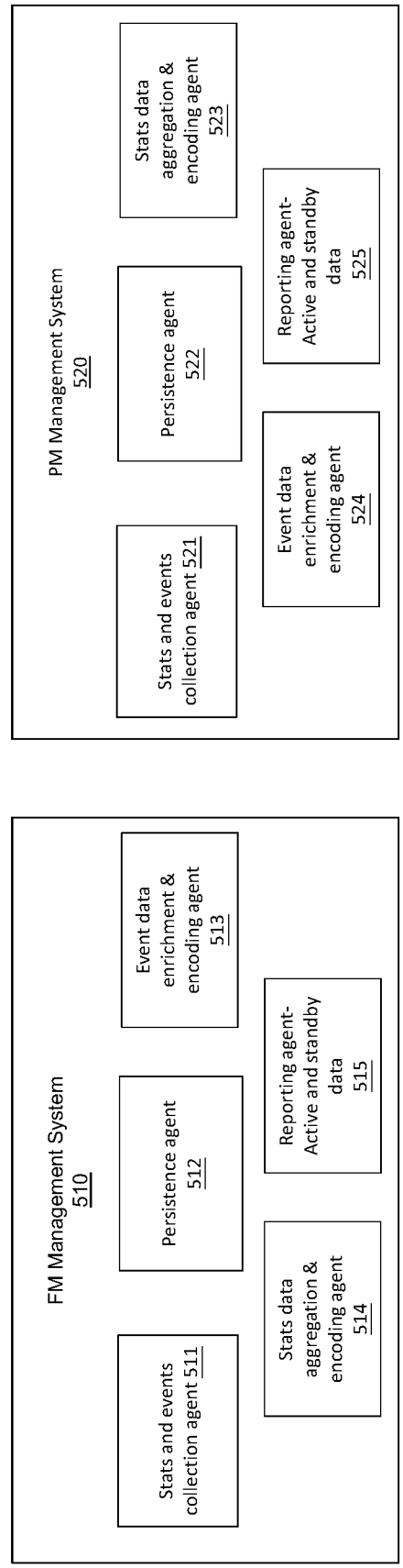
FIG. 5 is a block diagram of components of a FM microservice and a PM microservice, according to an embodiment.

FIG. 5 is a block diagram of components of an FM microservice 510 and a PM microservice 520, according to an example embodiment. Referring to FIG. 5, FM MS 510 with load balancing of PM MS 520 may include: stats and events collection agent 511 for receiving event data (e.g., fault-related event data) from subsystems (i.e., microservices) in the NF, as well as a standby function of receiving statistics data (PM data) from the subsystems in the case that the PM MS 520 has load issues (i.e., highly loaded); persistence agent 512 for storing the received event data (in either or both of raw data form as received or enriched/encoded form as processed by the FM MS 310), as well as a standby function of storing the received statistics data (in either or both of raw data form as received or aggregated/encoded form as processed by the FM MS 510 standby functionality) in the case that the PM MS 520 has load issues; event data enrichment & encoding agent 513 for enriching and encoding the received event data (raw data); stats data aggregation and encoding agent 514 (standby function) for aggregating and encoding the received statistics data (raw data) in the case that the PM MS 520 has load issues; and reporting agent 515 for reporting the enriched and encoded event data to the NBMS, as well as a standby function of reporting aggregated and encoded PM data (statistics data) in the case that the PM MS 520 has load issues.

The PM MS 520 with load balancing of FM MS 510 may include: stats and events collection agent 521 for receiving performance statistics data (e.g., throughput, active users, cell uptime, etc.) from subsystems (i.e., microservices) in the NF, as well as a standby function of receiving event data (FM data) from the subsystems in the case that the FM MS 510 has load issues (i.e., highly loaded); persistence agent 522 for storing the received performance statistics data (in either or both of raw data form as received or aggregated/encoded form as processed by the PM MS 520), as well as a standby function of storing the received event data (in either or both of raw data form as received or enriched/encoded form as processed by the PM MS 520 standby functionality) in the case that the FM MS 510 has load issues; stats data aggregation & encoding agent 523 for aggregating and encoding the received statistics data (raw data); event data enrichment & encoding agent 524 (standby function) for enriching and encoding the received event data (raw data) in the case that the FM MS 510 has load issues; and stats reporting agent 525 for reporting the aggregated and encoded statistics data to the NBMS, as well as a standby function of reporting enriched and encoded FM data (event data) in the case that the FM MS 510 has load issues.

Figure 6:
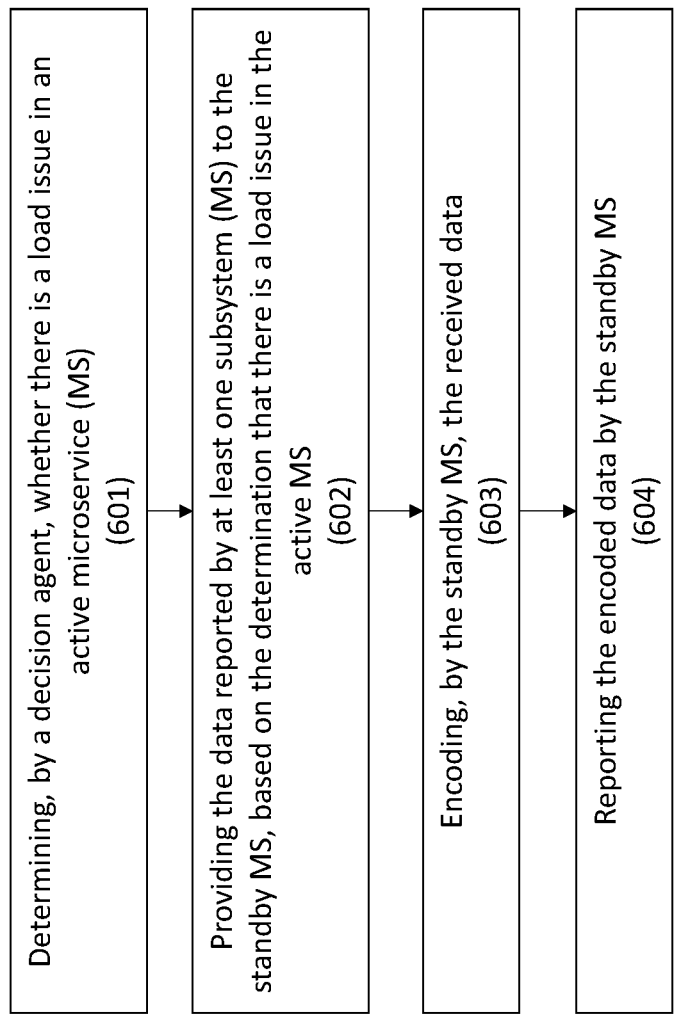
FIG. 6 is a flowchart of a method for load balancing of FM microservice and/or PM microservice, according to an embodiment.

FIG. 6 is a flowchart of a method for load balancing of an active MS of an NF, according to an embodiment.

Referring to FIG. 6, in operation 601, a decision agent determines whether the active MS is facing load issues. For example, the decision agent may determine that there is a load issue if it establishes that the active MS is overburdened with requests from other microservices (subsystems) of the NF, if it is unable to process the data without delay as there are many requests that are currently waiting to be processed, etc. The decision agent may make the determination based on a comparison of one or more processing or performance parameters against one or more predetermined thresholds. The decision agent may be integrated into the active MS or may be a distinct application, microservice, architecture layer, orchestrator, etc., that determines if there is a load issue with respect to the active MS.

In operation 602, based on the determination by the decision agent, data reported by at least one other MS (subsystem) for the active MS is instead provided to the standby MS. In this case, the decision agent may control to reroute the data from the at least one other MS (subsystem) to the standby MS. According to another embodiment, the raw data may be received by the active MS and then provided to the standby MS either directly or via the persistence layer. In the case that the standby MS receives the raw data from the at least one other MS (subsystem) or directly from the active MS, the standby MS may store the received raw data in the persistence layer.

In operation 603, the standby MS processes the data. For example, the processing may include aggregating statistics data, enriching event data, and encoding the received aggregated or enriched data for transmission.

At operation 604, the aforementioned processed or encoded data is reported to NBMS by the standby MS (e.g., via O1 interface, management interface, etc.).

Figure 7:
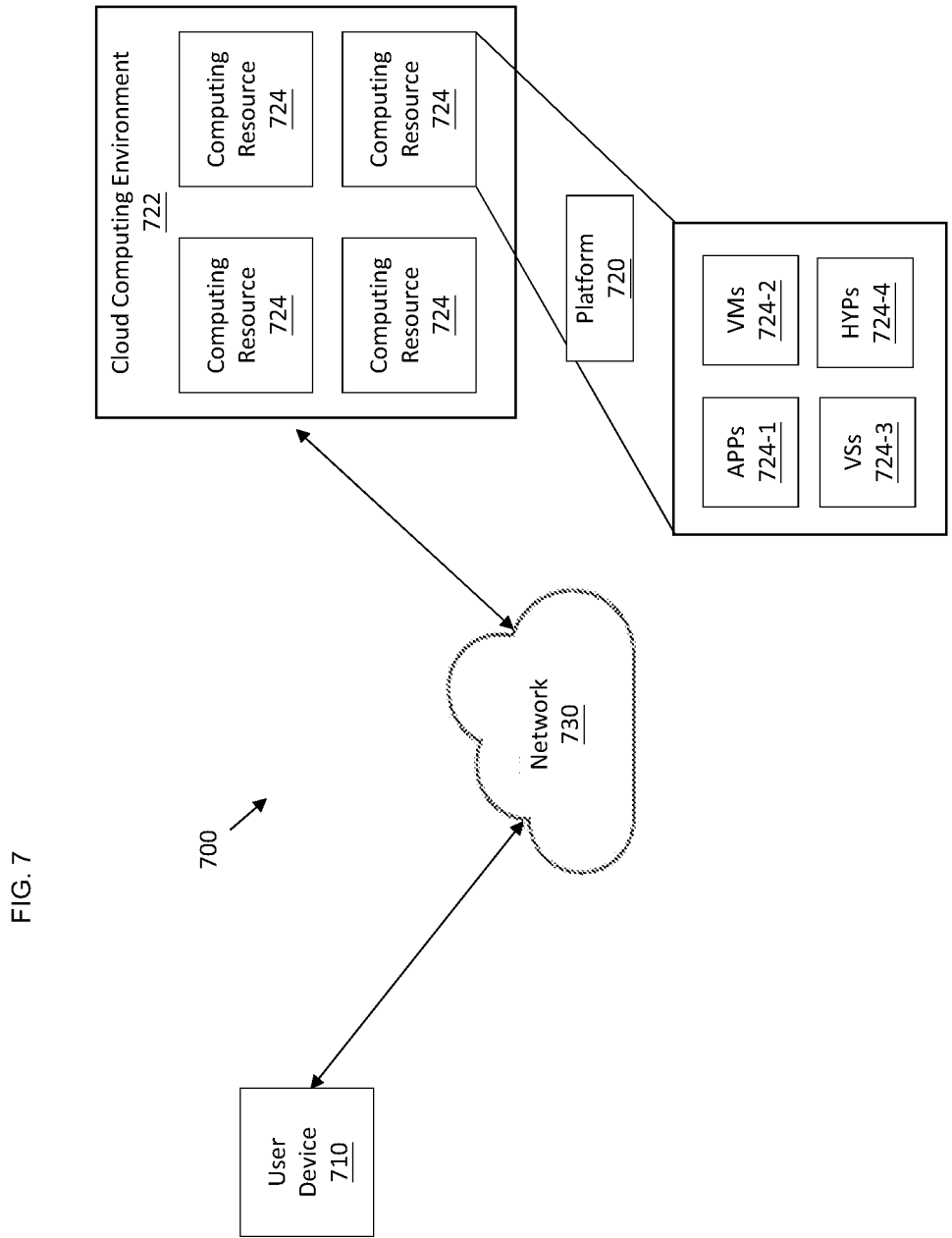
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIGS. 4 through 6 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
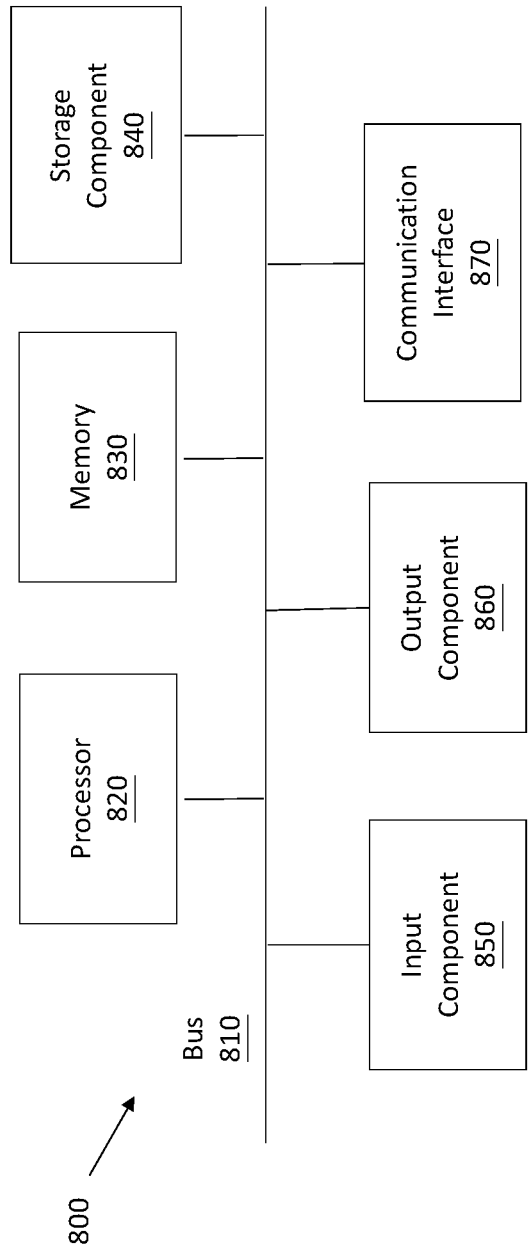
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 4 through 6 may be implemented by or using any one of the elements illustrated in FIGS. 7 and 8. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of load balancing of a Fault Management (FM) microservice (MS) and a Performance Management (PM) MS in a Radio Access Network (RAN) Network Function (NF), performed by at least one processor, the method comprising:
   determining whether there is a load issue in a first microservice (MS), the first MS being one of the FM MS and the PM MS, and the load issue being an overload of processing requests with respect to raw data reported by at least one other MS of the NF;
   based on determining that there is the load issue in the first MS, providing data, reported by the at least one other MS of the NF for the first MS, to a second MS, the second MS being another one of the FM MS and the PM MS, and the data being performance data for the PM MS or event data for the FM MS; and
   based on determining that there is the load issue in the first MS, processing, by the second MS, the data and reporting, from the second MS to a northbound management system (NBMS), the processed data, wherein the FM MS is configured to receive the event data from the at least one MS, and the PM MS is configured to receive the performance data from the at least one MS.

2. The method of claim 1, further comprising:
   storing, by the second MS, the data in a persistent storage.

3. The method of claim 1, wherein the processing and the reporting comprises:
   encoding, by the second MS, the data; and
   reporting, by the second MS, the encoded data to the NBMS.

4. The method of claim 3, wherein, based on the first MS being the FM MS and the second MS being the PM MS, the processing further comprises enriching, by the second MS, the data, the data being the event data.

5. The method of claim 3, wherein, based on the first MS being the PM MS and the second MS being the FM MS, the processing further comprises aggregating, by the second MS, the data, the data being the performance data.

6. The method of claim 1, wherein the event data comprises information on at least one fault or error event.

7. The method of claim 1, wherein the performance data comprises at least one performance statistic or counter.

8. A system for load balancing of a Fault Management (FM) microservice (MS) and a Performance Management (PM) MS in a Radio Access Network (RAN) Network Function (NF), the system comprising:
 at least one memory storing instructions; and
 at least one processor configured to execute the instructions to:
  determine whether there is a load issue in a first microservice (MS), the first MS being one of the FM MS and the PM MS, and the load issue being an overload of processing requests with respect to raw data reported by at least one other MS of the NF;
  based on determining that there is the load issue in the first MS, provide data, reported by the at least one other MS of the NF for the first MS, to a second MS, the second MS being another one of the FM MS and the PM MS, and the data being performance data for the PM MS or event data for the FM MS; and
  based on determining that there is the load issue in the first MS, process, by the second MS, the data and report, from the second MS to a northbound management system (NBMS), the processed data,
 wherein the FM MS is configured to receive the event data from the at least one MS, and the PM MS is configured to receive the performance data from the at least one MS.

9. The system of claim 8, wherein the at least one processor is further configured to execute the instructions to:
 store, by the second MS, the data in a persistent storage.

10. The system of claim 8, wherein the at least one processor is further configured to execute the instructions to process and report by:
 encoding, the data; and
 reporting, the encoded data to the NBMS.

11. The system of claim 10, wherein, based on the first MS being the FM MS and the second MS being the PM MS, the at least one processor is further configured to execute the instructions to process the data by:
 enriching the data, the data being the event data.

12. The system of claim 10, wherein, based on the first MS being the PM MS and the second MS being the FM MS, the at least one processor is further configured to execute the instructions to process the data by:
 aggregating, by the second MS, the data being the performance data.

13. The system of claim 8, wherein the event data comprises information on at least one fault or error event.

14. The system of claim 8, wherein the performance data comprises at least one performance statistic or counter.

15. A non-transitory computer-readable recording medium having recorded thereon instructions executable by at least one processor to perform a method of load balancing of a Fault Management (FM) microservice (MS) and a Performance Management (PM) MS in a Radio Access Network (RAN) Network Function (NF), performed by at least one processor, the method comprising:
 determining whether there is a load issue in a first microservice (MS), the first MS being one of the FM MS and the PM MS, and the load issue being an overload of processing requests with respect to raw data reported by at least one other MS of the NF;
 based on determining that there is the load issue in the first MS, providing data, reported by the at least one other MS of the NF for the first MS, to a second MS, the second MS being another one of the FM MS and the PM MS, and the data being performance data for the PM MS or event data for the FM MS; and
 based on determining that there is the load issue in the first MS, processing, by the second MS, the data and reporting, from the second MS to a northbound management system (NBMS), the processed data, wherein the FM MS is configured to receive the event data from the at least one MS, and the PM MS is configured to receive the performance data from the at least one MS.

16. The non-transitory computer-readable recording medium of claim 15 wherein the method further comprises:
 storing, by the second MS, the data in a persistent storage.

17. The non-transitory computer-readable recording medium of claim 15, wherein the processing and the reporting further comprises:
 encoding, by the second MS, the data; and
 reporting, by the second MS, the encoded data to the NBMS.

18. The non-transitory computer-readable recording medium of claim 17, wherein:
 based on the first MS being the FM MS and the second MS being the PM MS, the processing further comprises enriching, by the second MS, the data, the data being the event data.

19. The non-transitory computer-readable recording medium of claim 17, wherein:
 based on the first MS being the PM MS and the second MS being the FM MS, the processing further comprises aggregating, by the second MS, the data, the data being the performance data.

20. The non-transitory computer-readable recording medium of claim 15, wherein:
 the event data comprises information on at least one fault or error event; and
 the performance data comprises at least one performance statistic or counter.

* * * * *